(No Model.)

A. RAPS.
ASTATIC ELECTRICAL MEASURING INSTRUMENT.

No. 582,090. Patented May 4, 1897.

WITNESSES:
J. E. Hutchinson Jr.
J. S. Barker

INVENTOR:
August Raps
BY ATTORNEY:
H. N. Low

UNITED STATES PATENT OFFICE.

AUGUST RAPS, OF BERLIN, GERMANY, ASSIGNOR TO SIEMENS & HALSKE, OF SAME PLACE.

ASTATIC ELECTRICAL MEASURING INSTRUMENT.

SPECIFICATION forming part of Letters Patent No. 582,090, dated May 4, 1897.

Application filed October 1, 1896. Serial No. 607,596. (No model.)

*To all whom it may concern:*

Be it known that I, AUGUST RAPS, a subject of the German Emperor, residing at Berlin, in the German Empire, have invented certain new and useful Improvements in Astatic Electrical Measuring Instruments; and I do declare the following to be a full, clear, and exact description of the invention, such as will enable others skilled in the art to which it appertains to make and use the same.

This invention refers to a device which can be applied to electromagnetic measuring instruments for the purpose of compensating for the influences of erratic earth currents or any other exterior magnetic disturbances.

The invention consists in placing two stationary bundles of wire or equivalent cores in such a position at a greater distance from the stronger magnet than from the other that they will collect and force into a certain prearranged direction all lines of force traversing the instrument.

Figure 1:
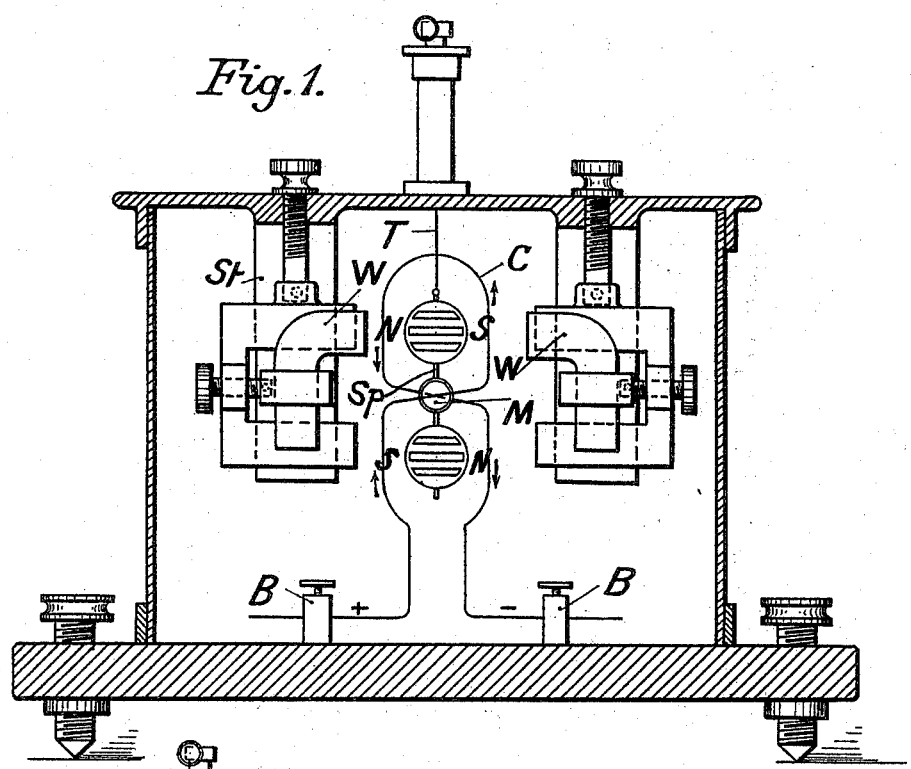
Figure 2:
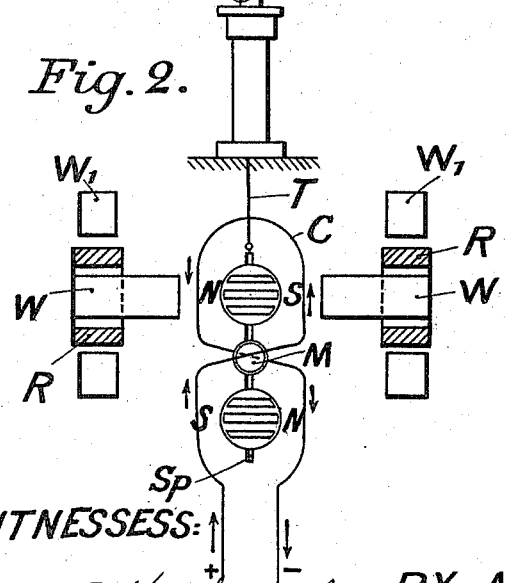
Figure 3:
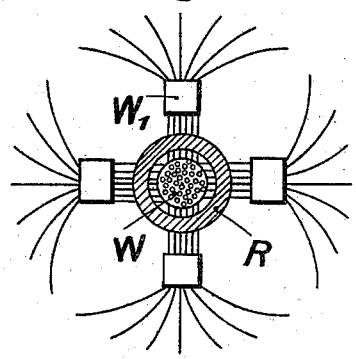

Of the accompanying drawings, Figure 1 is a section of a galvanometer, showing the application of the device forming the object of this invention. Fig. 2 is a diagram showing a modified form of my device, the wire bundles being shown in section; and Fig. 3 is an end view of the wire bundles made in the shape shown in Fig. 2 and showing how the lines of force are collected and directed by the said wire bundles.

The same letters of reference designate the same parts in all the figures.

N S and S N are the magnetic needles or systems of needles of an ordinary sensitive galvanometer.

Both needles are mounted in a relatively fixed position on a vertical spindle $Sp$, which at the same time carries the mirror M. The spindle $Sp$ is hung in the ordinary way by a thread T. The needles are fixed on the spindle $Sp$ in such a position that the direction of their magnetic axes are opposed to each other, as is usual in astatic instruments.

B− and B+ are two binding-posts which serve to connect the instrument.

W W are bundles of soft-iron wire of any suitable section.

$St$ $St$ are supports preferably fixed in any suitable way to the framework of the instrument and being arranged according to well-known principles in such a way that means are provided for altering the position of the wire bundles W W, which are fastened thereto either up and down or sidewise.

The position of the whole instrument is preferably so chosen that the plane traversing the centers of the wire bundles W W coincides with the local magnetic meridian.

C is a pair of stationary coils only diagrammatically illustrated by one single pair of windings in the figures and connected with the binding-posts B+ and B−. The pair of coils C is intended to convey the current, which is to be measured, and the coils are supposed to be wound in the way usual with astatic instruments, as is indicated by arrows.

In Fig. 2 only the most important features of instrument—*i. e.*, the astatic system of needles and the pair of stationary coils—are diagrammatically represented and a modified form of the wire bundles W is shown. The bundles are made straight instead of hooked and are each surrounded with an iron ring R, and this again is surrounded by a suitable number (for instance, four) of straight bundles W′, disposed radially. In some cases I find this more elaborate disposition preferable.

Fig. 3 shows the action of such a system of wire bundles, which consists in collecting and directing the lines of force.

I consider it to be self-evident that the magnetic needles N S and S N of the instrument can be replaced by any equivalent magnetic system, such as, for instance, coils excited by a current or the like.

The operation of the described device is as follows: By means of the movable support $St$, or by any equivalent means that may be provided, the wire bundles W W are given such a position that they make the system of needles N S and S N absolutely astatic, and thereby render it uninfluenced by any changes in the magnetic field of the earth. This result is obtained in the following manner: It is well known that by magnetizing an astatic system the directing force of the field of the earth can be considerably reduced, but it cannot be made to disappear as compared to the directing force resulting solely from the torsion of the thread by which the needles are hung, the reason of this being that the one of the two magnets will always remain appreciably stronger than the other. Therefore such an ordinary partially-astatic system will be influenced more or less by every local disturbance in the earth's magnetism. Now by giving two bundles of iron wire a relative position such as described above all lines of force passing in the neighborhood will be collected and will be forced into the line connecting the two bundles. Thus the result is obtained that all variations in the direction of the magnetic field of the earth are translated into variations of intensity. Now by giving the two wire bundles any definite position relatively to the two systems of magnetic needles the intensity of the field surrounding the one system of needles will have a definite ratio to the intensity of the field surrounding the other system of needles, and although with every local disturbance of the magnetic field of the earth the total intensity of the field in which the astatic system is suspended will vary the ratio of intensity to the part of the field in which the other needle is suspended will remain practically constant. Thus it will be seen that by giving the wire bundles W W any definite position toward the partially-astatic system the field of the earth can be made to exert a different directing influence on the two systems of needles forming together the astatic system, and by altering the position of the bundles W W toward the astatic system this difference can be altered, but the variations spontaneously occurring in the direction and intensity of the local magnetic meridian will not cause this difference to vary. Now as has been mentioned the system of needles cannot according to known methods be made sufficiently astatic to obviate the disturbances caused by variations of the magnetic field of the earth, but by the device described a means is provided of making the system very perfectly astatic. In fact it is found to be easy by gradually shifting the position of the bundles W W to find a position in which the difference in the directing influence exerted by that part of the field in which the upper needle is suspended and that part in which the lower needle is suspended is exactly sufficient to compensate the otherwise unavoidable differences in the magnetization of the two needles or systems of needles, so that only the directing influence remains, which is caused by the torsion of the thread by which the system of needles is hung.

Having now particularly described and ascertained the nature of my said invention and the manner in which the same is to be performed, I declare that what I claim is—

1. The combination with an astatic galvanometer or electrodynamometer, of a pair of suitably-shaped cores made of magnetic unmagnetized metal such as soft iron, placed at a greater distance from the stronger magnet of the astatic system than from the other, substantially as and for the purpose set forth.

2. The combination with an astatic galvanometer or electrodynamometer of a pair of suitably-shaped cores of magnetic unmagnetized metal such as soft iron, placed at a greater distance from one of the magnets of the astatic system than from the other, and means for shifting said system of iron cores in relation to the astatic system, substantially as and for the purpose set forth.

In testimony whereof I affix my signature in the presence of two witnesses.

AUGUST RAPS.

Witnesses:
W. H. MADDEN,
SOPHIE NAGEL.